United States Patent
Sakagami

(10) Patent No.: US 12,366,691 B2
(45) Date of Patent: Jul. 22, 2025

(54) OPTICAL FILTER-TYPE GLASS, OPTICAL FILTER, AND SOLID-STATE IMAGING DEVICE

(71) Applicant: AGC Inc., Tokyo (JP)

(72) Inventor: Takahiro Sakagami, Shizuoka (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/814,261

(22) Filed: Aug. 23, 2024

(65) Prior Publication Data
US 2024/0418916 A1    Dec. 19, 2024

Related U.S. Application Data

(63) Continuation of application No. PCT/JP2023/016213, filed on Apr. 25, 2023.

(30) Foreign Application Priority Data

Apr. 28, 2022  (JP) .................. 2022-074100

(51) Int. Cl.
  *G02B 5/20*  (2006.01)
  *C03C 3/21*  (2006.01)
  *G02B 1/00*  (2006.01)

(52) U.S. Cl.
  CPC .............. *G02B 5/208* (2013.01); *C03C 3/21* (2013.01); *G02B 1/00* (2013.01)

(58) Field of Classification Search
  CPC . G02B 5/208; G02B 5/20; G02B 5/22; G02B 5/226; G02B 1/00; C03C 3/21; C03C 3/16; C03C 3/17; C03C 3/12
  See application file for complete search history.

(56) References Cited

U.S. PATENT DOCUMENTS

| | | | |
|---|---|---|---|
| 5,529,960 A | 6/1996 | Aitken et al. | |
| 2020/0148884 A1* | 5/2020 | Hattori | H01L 27/146 |

FOREIGN PATENT DOCUMENTS

| | | |
|---|---|---|
| CN | 110156317 A | 8/2019 |
| JP | 2008-001543 A | 1/2008 |

(Continued)

OTHER PUBLICATIONS

International Search Report mailed on Jul. 18, 2023, issued in PCT/JP2023/016213 filed on Apr. 25, 2023, with English Translation, total 5 pages.

(Continued)

*Primary Examiner* — Stephone B Allen
*Assistant Examiner* — Adam W Booher
(74) *Attorney, Agent, or Firm* — Oblon, McClelland, Maier & Neustadt, L.L.P.

(57) ABSTRACT

Optical filter-type glass contains a P component, a Cu component, and Mo component, is substantially free of F, and includes: in mass % on an oxide basis, 60% to 75% of $P_2O_5$; 9% to 16.5% of $Al_2O_3$; 4% to 20% of $\Sigma R_2O$, where $R_2O$ is one or more components selected from $Li_2O$, $Na_2O$, $K_2O$, $Rb_2O$, and $Cs_2O$, and $\Sigma R_2O$ is a total amount of $R_2O$; 0% to 8% of $\Sigma R'O$, where $R'O$ is one or more components selected from CaO, MgO, BaO, SrO, and ZnO, and $\Sigma R'O$ is a total amount of $R'O$; more than 7% up to 20% of CuO; and 0.01% to 1.18% of $MoO_3$.

17 Claims, 2 Drawing Sheets

(56) References Cited

FOREIGN PATENT DOCUMENTS

| | | |
|---|---|---|
| JP | 2009-263190 A | 11/2009 |
| JP | 2010-008908 A | 1/2010 |

OTHER PUBLICATIONS

Notice of Reasons of Refusal mailed on Mar. 5, 2024 issued in JP 2024-504244, with English Translation, total 7 pages.
Decision to Grant a Patent mailed on Apr. 2, 2024 issued in JP 2024-504244, with English Translation, total 5 pages.

* cited by examiner

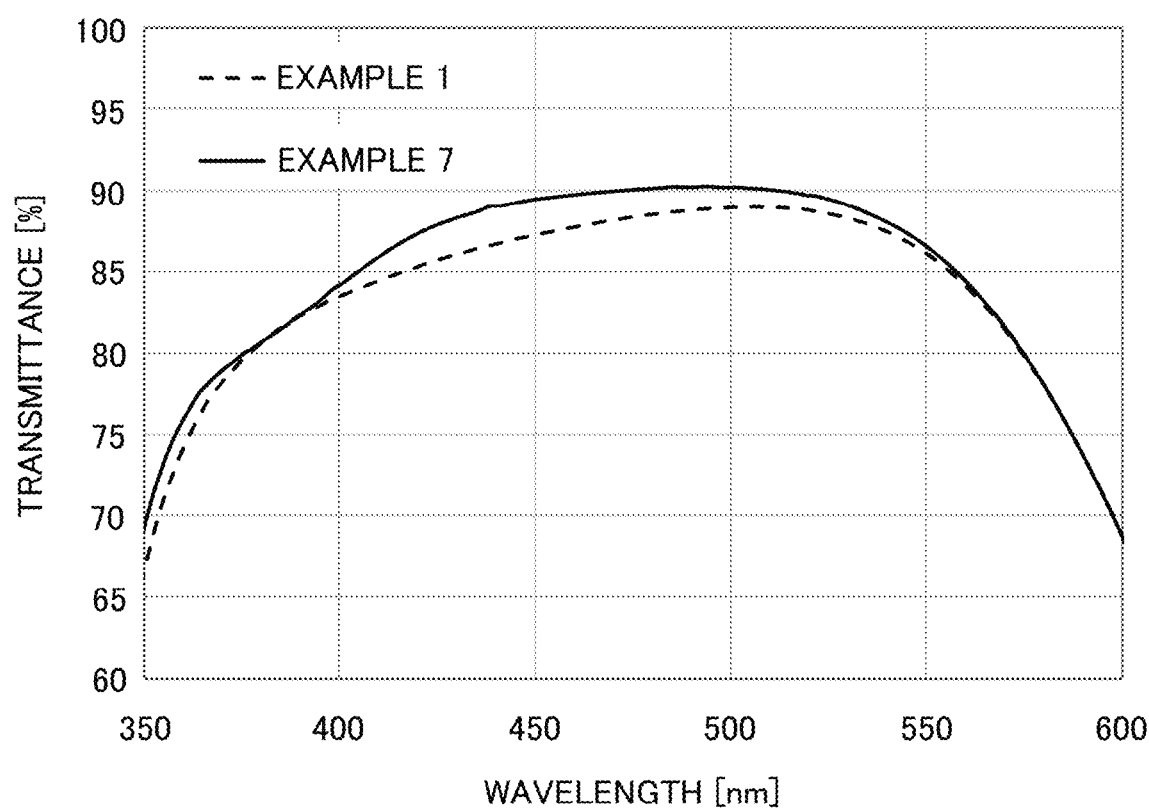

OPTICAL FILTER-TYPE GLASS, OPTICAL FILTER, AND SOLID-STATE IMAGING DEVICE

CROSS-REFERENCE TO RELATED APPLICATION

The present application is a continuation application of International Application No. PCT/JP2023/016213, filed Apr. 25, 2023, which claims priority to Japanese Patent Application No. 2022-074100 filed Apr. 28, 2022. The contents of these applications are incorporated herein by reference in their entirety.

BACKGROUND OF THE INVENTION

1. Field of the Invention

The disclosures herein relate to optical filter-type glass and optical filters that are used in color correction filters or the like in solid-state imaging devices such as digital still cameras and color video cameras, and that have superb light transmittance in the visible region and superb light absorption in the near-infrared region in particular.

2. Description of the Related Art

A solid-state imaging device such as CCD and CMOS used in digital still camera or the like has spectral sensitivity over a range from the visible region to around 1,200 nm in the near-infrared region. Consequently, the solid-state imaging device as such is unable to obtain good color reproducibility, and thus the visual sensitivity of the solid-state imaging device is corrected using near-infrared cut filter glass doped with a specific substance that absorbs infrared rays. As the near-infrared cut filter glass, an optical glass obtained by doping phosphate glass with copper (Cu) is developed and used so as to selectively absorb light at wavelengths in the near-infrared region. The compositions of such types of glass are disclosed in Patent Document 1.

In phosphate glass, the temperature at which the glass raw material is melted is 1,000° C. or higher, which is a high temperature, and at this temperature, the transmittance of light (blue light, in particular) in the visible region tends to be low. The possible reasons are as follows. In Cu-doped phosphate glass, the Cu component in the glass is known to exist as $Cu^{2+}$ (divalent), which absorbs light at a wavelength in the near-infrared region, and $Cu^+$ (monovalent), which has absorption properties for light at a wavelength of about 300 nm to 600 nm. When the temperature at which the glass raw material is melted is high, part of the Cu component in the glass remains as $Cu^+$ (does not become $Cu^{2+}$), and consequently the transmittance of light (blue light, in particular) in the visible region becomes low. When the temperature at which the glass raw material is melted is lowered, unmelted undesirable matter forms in the glass, and consequently the transmittance of light in the visible region decreases significantly, which is problematic.

The present disclosure has been made in view of the above circumstances, and it is an object of the present disclosure to provide optical filter-type glass, an optical filter, and a solid-state imaging device that are capable of keeping the transmittance of light in the near-infrared region low while maintaining a high transmittance of light in the visible region (blue light, in particular).

As a result intensive investigation, the present inventors have found that optical filter-type glass and an optical filter obtained by using phosphate glass doped with Cu and molybdenum (Mo) are capable of keeping the transmittance of light in the near-infrared region low while maintaining a high transmittance of light in the visible region as compared with a conventional optical filter.

RELATED-ART DOCUMENTS

Patent Documents

Patent Document 1: Unexamined Japanese Patent Application Publication No. 2010-008908

SUMMARY OF THE INVENTION

According to one aspect of the present disclosure, optical filter-type glass contains a P component, a Cu component, and Mo component, is substantially free of F, and includes in mass % on an oxide basis,
- 60% to 75% of $P_2O_5$;
- 9% to 16.5% of $Al_2O_3$;
- 4% to 20% of $\Sigma R_2O$, where $R_2O$ is one or more components selected from $Li_2O$, $Na_2O$, $K_2O$, $Rb_2O$, and $Cs_2O$, and $\Sigma R_2O$ is a total amount of $R_2O$;
- 0% to 8% of $\Sigma R'O$, where $R'O$ is one or more components selected from CaO, MgO, BaO, SrO, and ZnO, and $\Sigma R'O$ is a total amount of $R'O$;
- more than 7% up to 20% of CuO; and
- 0.01% to 1.18% of $MoO_3$.

Effects of the Invention

According to the present disclosure, the optical filter-type glass and the optical filter are capable of keeping the transmittance of light in the near-infrared region low while maintaining a high transmittance of light (blue light, in particular) in the visible region as compared with a conventional optical filter.

BRIEF DESCRIPTION OF THE DRAWINGS

FIG. 2 is a graph illustrating the transmittance of light over a wavelength range of 350 nm to 600 nm in Example 7 (Exemplary Example) and Example 1 (Comparative Example).

DESCRIPTION OF THE PREFERRED EMBODIMENT

Figure 1:
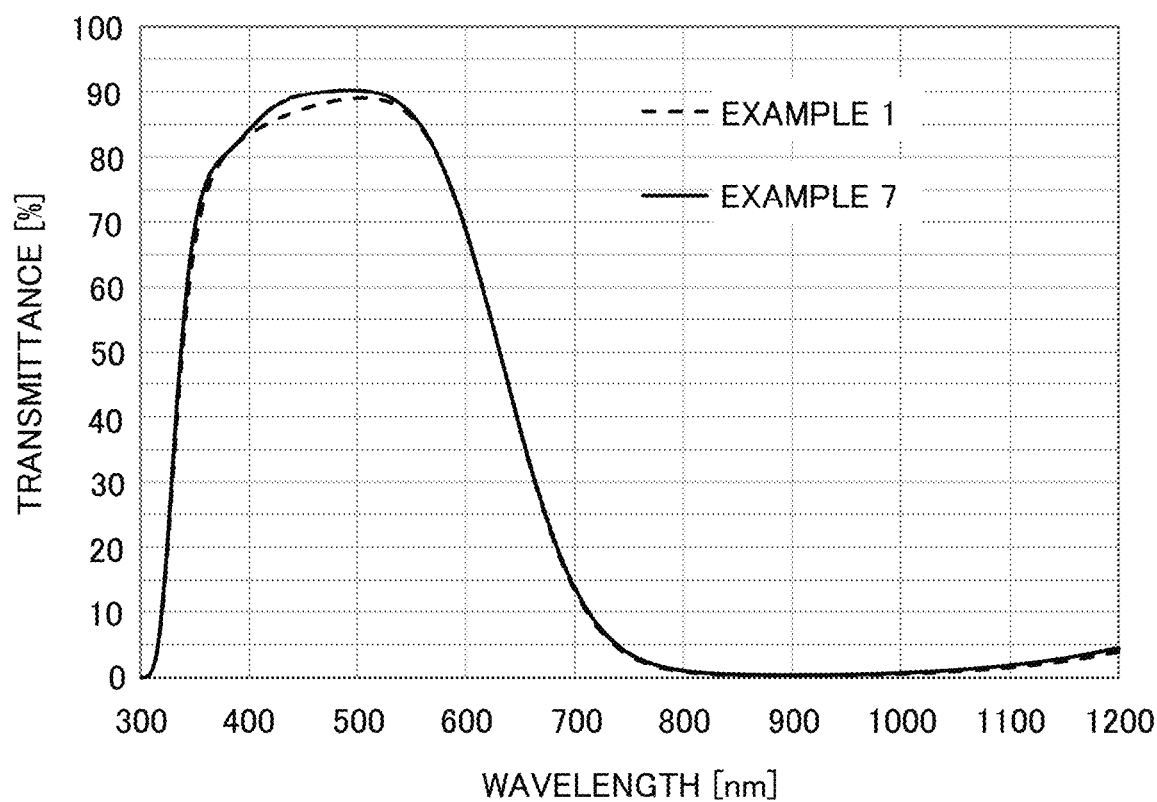
FIG. 1 is a graph illustrating the transmittance of light over a wavelength range of 300 nm to 1,200 nm in Example 7 (Exemplary Example) and Example 1 (Comparative Example)

Hereinafter, the embodiments for carrying out the present disclosure are described in detail. The present disclosure is not limited to the embodiments described below.

In the present disclosure, "α to β" indicating a range means "α or more and β or less".

The components constituting the glass of the present embodiment and the respective suitable content amounts are described below. In this specification, unless otherwise specified, the content amount of each component and the total content amount shall be expressed in mass % on an oxide basis. The transmittance of the glass of the present embodiment includes the reflection properties of the glass surface (that is, the external transmittance of the glass, not the internal transmittance of the glass).

$P_2O_5$ is a main component for forming the glass and is an essential component for enhancing the near-infrared cutting performance. When the content amount of $P_2O_5$ is 40% or more, this effect can be sufficiently obtained, and when the content amount is 80% or less, the glass is unlikely to be unstable or have problems such as reduced weather resistance. Therefore, the content amount is preferably 50% to 80%, more preferably 52% to 78%, even more preferably 54% to 77%, yet even more preferably 56% to 76%, and most preferably 60% to 75%.

$Al_2O_3$ is a main component for forming glass and for enhancing the strength of glass. When the content amount of $Al_2O_3$ is 5% or more, the effect can be sufficiently obtained, and when the content amount is 20% or less, problems such as glass instability and a reduction in near-infrared cutting performance are unlikely to arise. Therefore, the content amount is preferably 5% to 20%, more preferably 6% to 18%, even more preferably 7% to 17%, yet even more preferably 8% to 17%, and most preferably 9% to 16.5%.

$R_2O$ (where $R_2O$ is one or more components selected from $Li_2O$, $Na_2O$, $K_2O$, $Rb_2O$, and $Cs_2O$.) is a component for lowering the melting temperature of glass, lowering the liquid phase temperature of glass, stabilizing glass, and the like. It is preferable when the total amount of $R_2O$ ($\Sigma R_2O$) is 0.5% or more because these effects are sufficiently obtained. Likewise, it is preferable when the total amount is 20% or less because the glass is unlikely to be unstable. Therefore, the total amount is preferably 0.5% to 20%, more preferably 1% to 20%, even more preferably 2% to 20%, yet even more preferably 3% to 20%, and most preferably 4% to 20%.

$Li_2O$ is a component for lowering the melting temperature of glass, lowering the liquid phase temperature of glass, stabilizing glass, and the like. The content amount of $Li_2O$ is preferably 0% to 15%. It is preferable when the content amount of $Li_2O$ is 15% or less because problems such as glass instability and a reduction in near-infrared cutting performance are unlikely to arise. The content amount of $Li_2O$ is more preferably 0% to 8%, even more preferably 0% to 7%, yet even more preferably 0% to 6%, and most preferably 0% to 5%.

$Na_2O$ is a component for lowering the melting temperature of the glass, lowering the liquid phase temperature of the glass, stabilizing the glass, and the like. The content amount of $Na_2O$ is preferably 0% to 15%. It is preferable when the content amount of $Na_2O$ is 15% or less because the glass is unlikely to be unstable. The content amount of $Na_2O$ is more preferably 0.5% to 14%, even more preferably 1% to 13%, and yet even more preferably 2% to 13%.

$K_2O$ is a component that has the effects of lowering the melting temperature of the glass, lowering the liquid phase temperature of the glass, and the like. The content amount of $K_2O$ is preferably 0% to 15%. It is preferable when the content amount of $K_2O$ is 15% or less because the glass is unlikely to be unstable. The content amount of $K_2O$ is more preferably 0.5% to 14%, even more preferably 1% to 13%, and yet even more preferably 2% to 13%.

$Rb_2O$ is a component that has the effects of lowering the melting temperature of the glass, lowering the liquid phase temperature of the glass, and the like. The content amount of $Rb_2O$ is preferably 0% to 15%. It is preferable when the content amount of $Rb_2O$ is 15% or less because the glass is unlikely to be unstable. The content amount of $Rb_2O$ is preferably 0.5% to 14%, more preferably 1% to 13%, and even more preferably 2% to 13%.

$Cs_2O$ is a component that has the effects of lowering the melting temperature of the glass, lowering the liquid phase temperature of the glass, and the like. The content amount of $Cs_2O$ is preferably 0% to 15%. It is preferable when the content amount of $Cs_2O$ is 15% or less because the glass is unlikely to be unstable. The content amount of $Cs_2O$ is more preferably 0.5% to 14%, even more preferably 1% to 13%, and yet even more preferably 2% to 13%.

In addition, when two or more types of alkali metal components denoted by $R_2O$ are added at the same time, a mixed alkali effect occurs in the glass, and thus the mobility of $R^+$ ions decreases. Thereby, when the glass comes into contact with water, a hydration reaction caused by the ion exchange between the $H^+$ ion in the water molecule and the $R^+$ ion in the glass is inhibited, and thus the weathering resistance of the glass is improved. Therefore, the glass of the present embodiment preferably contains two or more components selected from $Li_2O$, $Na_2O$, $K_2O$, $Rb_2O$, and $Cs_2O$. In such a case, the total amount ($\Sigma R_2O$) of R2O (where $R_2O$ is $Li_2O$, $Na_2O$, $K_2O$, $Rb_2O$, and $Cs_2O$) is preferably more than 7% up to 18%. When the total amount of $R_2O$ is more than 7%, the effect can be sufficiently obtained, and when the total amount is less than 18%, problems such as glass instability, a reduction in near-infrared cutting performance, and a reduction in glass strength are unlikely to arise. Therefore, $\Sigma R_2O$ is preferably more than 7% but less than 18%, more preferably 7.5% to 17%, even more preferably 8% to 16%, yet even more preferably 8.5% to 15%, and most preferably 9% to 14%.

R'O (where R'O is one or more components selected from CaO, MgO, BaO, SrO, and ZnO) is a component for lowering the melting temperature of the glass, lowering the liquid phase temperature of the glass, stabilizing the glass, increasing the strength of the glass, and the like. The total amount of R'O ($\Sigma$R'O) is preferably 0% to 15%. It is preferable when the total amount of R'O is 15% or less because problems such as glass instability, a reduction in near-infrared cutting performance, and a reduction in glass strength are unlikely to arise. The total amount of R'O is preferably 0% to 13%, more preferably 0% to 11%, even more preferably 0% to 9%, and yet even more preferably 0% to 8%.

CaO is a component for lowering the melting temperature of the glass, lowering the liquid phase temperature of the glass, stabilizing the glass, increasing the strength of the glass, and the like. The content amount of CaO is preferably 0% to 10%. It is preferable when the content amount of CaO is 10% or less because problems such as glass instability and a reduction in near-infrared cutting performance are unlikely to arise. The content amount of CaO is more preferably 0% to 8%, even more preferably 0% to 6%, more preferably 0% to 5%, and most preferably 0% to 4%.

MgO is a component for lowering the melting temperature of the glass, lowering the liquid phase temperature of the glass, stabilizing the glass, increasing the strength of the glass, and the like. The content amount of MgO is preferably 0% to 15%. It is preferable when the content amount of MgO is 15% or less because problems such as glass instability and a reduction in near-infrared cutting performance are unlikely to arise. The content amount of MgO is more preferably 0% to 13%, even more preferably 0% to 10%, yet even more preferably 0% to 9%, and most preferably 0% to 8%.

BaO is a component for lowering the melting temperature of glass, lowering the liquid phase temperature of glass, stabilizing glass, and the like. The content amount of BaO is preferably 0.1% to 10%. It is preferable when the content amount of BaO is 10% or less because problems such as glass instability and a reduction in near-infrared cutting performance are unlikely to arise. The content amount of BaO is more preferably 0% to 8%, even more preferably 0% to 6%, yet even more preferably 0% to 5%, and most preferably 0% to 4%.

SrO is a component for lowering the melting temperature of the glass, lowering the liquid phase temperature of the glass, stabilizing the glass, and the like. The content amount of SrO is preferably 0% to 10%. It is preferable when the content amount of SrO is 10% or less because problems such as glass instability and a reduction in near-infrared cutting performance are unlikely to arise. The content amount of SrO is more preferably 0% to 8%, even more preferably 0% to 7%, and most preferably 0% to 6%.

ZnO has the effects of lowering the melting temperature of the glass, lowering the liquid phase temperature of the glass, and the like. The content amount of ZnO is preferably 0% to 15%. It is preferable when the content amount of ZnO is 15% or less because problems such as a reduction in the solubility of glass and a reduction in the near-infrared cutting performance are unlikely to arise. The content amount of ZnO is more preferably 0% to 13%, even more preferably 0% to 10%, yet even more preferably 0% to 9%, and most preferably 0% to 8%.

The glass of the present embodiment preferably is substantially free of divalent cations of elements other than Cu. The reasons for this are described below. R' is one example of elements other than Cu. Accordingly, ΣR'O is preferably 0%.

In a case where the glass of the present embodiment contains CuO, light in the near-infrared region is cut by light absorption of $Cu^{2+}$ ions. The light absorption is caused by electron transitions between d orbitals of $Cu^{2+}$ ions split by the electric field of $O^{2-}$ ions. The splitting of d orbitals is promoted by decreasing the symmetry of $O^{2-}$ ions existing around $Cu^{2+}$ ions. For example, when cations exist around $O^{2-}$ ions, the electric field of the cations attracts $O^{2-}$ ions and decreases the symmetry of $O^{2-}$ ions. As a result, the splitting of d orbitals is promoted, and the light absorption due to the electron transition between the respective split d orbitals occurs, thereby weakening the light absorption performance in the near-infrared region (wavelengths: 750 nm or more and less than 1,000 nm) and strengthening the light absorption performance in the short-wavelength infrared region (wavelengths: 1,000 nm or more and less than 2,500 nm). Since the electric field strength of cations becomes stronger when the valence of ions is great, especially when an oxide containing divalent cations of elements other than Cu is added to the glass, there is a risk that the near-infrared cutting performance will decrease and the transmission of short-wavelength infrared rays will decrease.

$MoO_3$ is an essential component for increasing the transmittance of light in the visible region of glass. The inventors prepared Cu-doped phosphate glass (However, the glass does not contain a fluorine component.) and the Cu-doped phosphate glass of the same type except that it is also doped with just Mo, and confirmed the optical properties thereof. Based on the results, it was confirmed that the transmittance of light over a wavelength range of 400 nm to 540 nm greatly increased in the latter compared with the former. This phenomenon, although hypothetical, is considered to be caused by the following.

Mo is known to exist as $Mo^{6+}$ in glass. However, when phosphate glass is co-doped with Mo and Cu, $Cu^+$ in the glass emits electrons to form $Cu^{2+}$ ($Cu^+ \rightarrow Cu^{2+} + e^-$), and $Mo^{6+}$ receives electrons emitted by Cu+ to form $Mo^{5+}$ ($Mo^{6+} + e^- \rightarrow Mo^{5+}$). As a result, the proportion of $Cu^+$ (monovalent) having absorption properties around the wavelength of 300 nm to 600 nm decreases, and the transmittance of light at the wavelength of 400 nm to 540 nm increases. Since Mo ions absorb light at the wavelength at around 400 nm, it is considered that the transmittance of light at the wavelength of around 400 nm does not increase. Phosphate glass co-doped with Cu and Mo is not known in the art, and it is considered that the above is a new knowledge found by the present inventors.

When the content amount of $MoO_3$ is 0.01% or more, the effect of increasing the transmittance of light in the visible region of the glass can be sufficiently obtained, and when the content is 10% or less, problems such as a reduction in near-infrared cutting performance and the formation of devitrified unwanted matter in the glass are unlikely to arise. The content amount of $MoO_3$ is more preferably 0.02% to 9%, more preferably 0.03% to 8%, more preferably 0.04% to 7%, and most preferably 0.05% to 6%.

CuO is an essential component for cutting near-infrared rays. When the content amount of CuO is more than 2.0%, the effect and the effect of increasing the transmittance of light in the visible region of the glass obtained when it is co-added with $MoO_3$ can be sufficiently obtained, and if the content is less than 20%, this is preferable because problems such as the formation of devitrified unwanted matter in the glass and the decrease in the transmittance of light in the visible region are unlikely to arise. It is more preferably 4% to 19.5%, more preferably 5% to 19%, more preferably 6% to 18.5%, and most preferably more than 7% up to 18%.

In the glass of the present embodiment, although F is an effective component for improving weather resistance, the glass is substantially free of F because it is an environmentally hazardous substance and may reduce near-infrared cutting performance.

In the present disclosure, substantially free of a specific component is a state where the specific component is not intentionally added, and does not exclude the inclusion of the specific component to the extent that it is unavoidably mixed in from raw materials or the like and does not affect the desired properties.

$B_2O_3$ may be included in the range of 10% or less to stabilize the glass. It is preferable when the content amount of $B_2O_3$ is 10% or less because problems such as a reduction in weather resistance of the glass and a reduction in the near-infrared cutting performance are unlikely to arise. Preferably, the content is 9% or less, more preferably 8% or less, even more preferably 7% or less, yet even more preferably 6% or less, and most preferably 5% or less.

In the glass of the present embodiment, $SiO_2$, $GeO_2$, $ZrO_2$, $SnO_2$, $TiO_2$, $CeO_2$, $WO_3$, $Y_2O^3$, $La_2O_3$, $Gd_2O_3$, $Yb_2O_3$, and $Nb_2O_5$ may be contained in a range of 5% or less to increase the weather resistance of the glass, as a total amount. It is preferable when the content amount of these components is 5% or less because problems such as the formation of devitrified unwanted matter in the glass and a reduction in near-infrared cutting performance are unlikely to arise. The content amount of these components is preferably 4% or less, more preferably 3% or less, even more preferably 2% or less, and yet even more preferably 1% or less.

$Fe_2O_3$, $Cr_2O_3$, $Bi_2O_3$, NiO, $V_2O_5$, $MnO_2$, and CoO are all components that decrease the transmittance of light in the visible region by being present in glass. Therefore, it is preferable the glass is substantially free of these components.

The glass of the present embodiment preferably has a thermal expansion coefficient of $60 \times 10^{-7}/°C$ to $180 \times 10^{-7}/°C$ in the range of 30° C. to 300° C.

When the glass of the present embodiment is to be used as a color correction filter (near-infrared cut filter glass) of a solid-state imaging device, it may be directly bonded to packaging in order to serve as a cover glass for hermetically sealing the solid-state imaging device. In such a case, if the thermal expansion coefficient difference between the near-infrared cut filter glass and the packaging is large, there is a risk that peeling or breakage may occur at the bonded portion, and consequently the hermetically sealed state may be unable to be maintained.

Generally, materials such as glass, crystallized glass, ceramics, and alumina are used as the packaging in consideration of heat resistance, and it is preferable to reduce the difference in thermal expansion coefficient between these packaging and the near-infrared cut filter glass. Therefore, it is preferable that the thermal expansion coefficient of the glass of the present embodiment is in the range of 30° C. to 300° C. If the thermal expansion coefficient of the glass of the present embodiment falls outside of this range, the difference in the thermal expansion coefficient between the glass and the packaging is large, and there is a risk that the glass will be unable to maintain the hermetically sealed state due to peeling or breakage. A more preferable range of the thermal expansion coefficient is $65 \times 10^{-7}/°$ C. to $175 \times 10^{-7}/°$ C., and an even more preferable range is $70 \times 10^{-7}/°$ C. to $170 \times 10^{-7}/°$ C.

The glass of the present embodiment has an average transmittance of 88.5% or more of light over a wavelength range of 450 nm to 500 nm and an average transmittance of 1.5% or less of light over a wavelength range of 850 nm to 900 nm, when the glass has a thickness of 0.3 mm, as measured when light is incident toward the main surface in a direction normal to the main surface. With the glass of the present embodiment having such optical properties, glass suitable as an optical filter that is capable of keeping the transmittance of light in the near-infrared region low while maintaining a high transmittance of light in the visible region can be obtained.

In the glass of the present embodiment, the average transmittance of light over a wavelength range of 450 nm to 500 nm, when a thickness of the glass is 0.3 mm, is preferably 88.6% or more, more preferably 88.7% or more, even more preferably 88.8% or more, yet even more preferably 88.9% or more, and most preferably 89% or more.

In the glass of the present embodiment, the average transmittance of light over a wavelength range of 850 nm to 900 nm, when a thickness of the glass is 0.3 mm, is preferably 1.4% or less, more preferably 1.3% or less, even more preferably 1.1% or less, yet even more preferably 0.9% or less, and most preferably 0.7% or less.

In the glass of the present embodiment, the average transmittance ratio A/B is 1.140 to 2.000, where A is the average transmittance of light over a wavelength range of 450 nm to 500 nm and B is the average transmittance of light over a wavelength range of 350 nm to 400 nm is B, when a thickness of the glass is 0.3 mm. Since the glass of the present embodiment has such optical properties, ultraviolet rays in the visible region can be cut, in a state where a high transmittance of blue light in particular is maintained. If the average transmittance ratio A/B is less than 1.140, the aforementioned effects may be unable to be sufficiently obtained, which is undesirable. If the average transmittance ratio A/B is more than 2.000, the absorption of light in the ultraviolet region may extend to the visible region, and thus the transmittance of light in the visible region may decrease. The glass of the present embodiment preferably has an average transmittance ratio A/B of 1.145 to 2.000, more preferably 1.150 to 1.900, even more preferably 1.160 to 1.800, yet even more preferably 1.170 to 1.700, and most preferably 1.180 to 1.600.

When the glass of the present embodiment is used as a color correction filter for a solid-state imaging device, for example, the thickness is usually 2 mm or less. From the viewpoint of component weight reduction, the thickness is preferably 1 mm or less, more preferably 0.5 mm or less, even more preferably 0.3 mm or less, and yet even more preferably 0.2 mm or less. Also, from the viewpoint of ensuring the strength of the glass, the thickness is preferably 0.05 mm or more.

The glass of the present embodiment can be manufactured, for example, as follows.

First, the raw materials are weighed and mixed to achieve the composition range described above (mixing step). The raw material mixture is put in a platinum crucible and melted by heating it in an electric furnace at a temperature of 950° C. to 1,300° C. (melting step). After sufficient stirring and fining, the mixture is cast into a mold, cut and polished, and shaped into a flat plate having a predetermined thickness (shaping step).

In the melting step of the manufacturing method, the highest temperature of the glass during glass melting is preferably set to 1,300° C. or less. If the highest temperature of the glass during glass melting exceeds 1,300° C., the transmittance property decreases. The temperature is more preferably 1,250° C. or less, even more preferably 1,200° C. or less, and yet even more preferably 1,150° C. or less.

Further, if the temperature in the melting step becomes too low, problems such as devitrification during melting, additional time being required for melting to take place may arise, and thus the temperature is preferably 1,000° C. or more, and more preferably 1,025° C. or more.

The glass of the present embodiment may be formed into a predetermined shape, and then an optical multilayer film may be provided on at least one surface of the glass to obtain an optical filter having the above-mentioned optical filter-type glass. Examples of the optical multilayer film include an IR-cut film (a film reflecting near-infrared rays), a UV/IR-cut film (a film reflecting ultraviolet rays and near-infrared rays), a UV-cut film (a film reflecting ultraviolet rays), an anti-reflection film, and the like. These optical thin films can be formed by publicly-known methods such as a vapor deposition method or a sputtering method.

An adhesion-strengthening film may be provided between the glass of the present embodiment and the optical multilayer film. By providing the adhesion-strengthening film, the adhesion between the glass and the optical multilayer film is enhanced, and the film peeling can be prevented or substantially prevented. Examples of the adhesion-strengthening film include silicon oxide ($SiO_2$), titanium oxide ($TiO_2$), lanthanum titanate ($La_2Ti_2O_7$), aluminum oxide ($Al_2O_3$), a mixture of aluminum oxide and zirconium oxide ($ZrO_2$), magnesium fluoride ($MgF_2$), calcium fluoride ($CaF_2$), strontium fluoride ($SrF_2$), fluorosilicone, and the like. The material containing fluorine or oxygen has higher adhesion, and magnesium fluoride and titanium oxide in particular are preferable as adhesion-strengthening films because they have higher adhesion to glass and films. The adhesion-strengthening film may be a single layer or two or more layers. In the case of two or more layers, multiple substances may be combined together.

The optical filter of the present embodiment includes the glass of the present embodiment described above. In addition to the glass of the present embodiment, the optical filter of the present embodiment may have the following configuration.

The optical filter of the present embodiment may include an absorption layer containing a near-infrared absorbing material having a maximum absorption wavelength in the near-infrared region on at least one main surface of the glass of the present embodiment. With this configuration, an optical filter having an even lower transmittance of light in the near-infrared region can be obtained.

The optical filter of the present embodiment is selected from acrylic resin, epoxy resin, en-thiol resin, polycarbonate resin, polyether resin, polyarylate resin, polysulfone resin, polyethersulfone resin, polyparaphenylene resin, polyarylene ether phosphine oxide resin, polyimide resin, polyamide-imide resin, polyolefin resin, cyclic olefin resin, and polyester resin, and is preferably contained in the absorption layer by adding a near-infrared absorbing dye to a transparent resin obtained by mixing one type of the transparent resin alone or two types or more.

The near-infrared absorbing dye preferably includes at least one type selected from the group consisting of squarylium dye, phthalocyanine dye, cyanine dye, and indocyanine dye.

EXEMPLARY EXAMPLES

Although Exemplary Examples are described below, the present disclosure is not limited to these Exemplary Examples.

The Exemplary Examples and Comparative Examples of optical filter-type glass of the present disclosure are illustrated in Tables 1 to 2 and 5. Examples 1, 13, and 16 are Comparative Examples, and Examples 2 to 12, 14, 15, and 17 are Exemplary Examples.

[Manufacturing Glass]

For each glass described above, the raw materials were weighed and mixed to obtain the compositions illustrated in Tables 1 to 2 and 5 (in terms of the oxide mass percentage, being substantially fluorine-free in each glass), placed in a crucible having an internal volume of about 400 cc, and melted under atmospheric conditions for 2 hours. The melting temperatures of the glass raw materials were 1,100° C. for Examples 3, 6, and 16, 1,050° C. for Examples 1, 2, 4, 5, and 7 to 12, 1,150° C. for Examples 13 to 15, and 1,125° C. for Example 17. After that, the glass was fines, stirred, and cast into a rectangular mold of 100 mm length×80 mm width×20 mm height in size that has been preheated to approximately 300° C. to 500° C., and then slowly cooled at approximately 1° C./min to obtain a glass that is a plate-shaped sample with both sides optically polished and being 40 mm length×30 mm width×0.3 mm thickness in size.

In the case of $P_2O_5$, one or more of $H_3PO_4$, $Al(PO_3)_3$, $NaPO_3$, and $KPO_3$ were used as the raw material for each glass.

In the case of $Al_2O_3$, $Al(PO_3)_3$ was used.

In the case of $Li_2O$, one or more of $LiPO_3$, $LiNO_3$, and $Li_2CO_3$ were used.

In the case of $Na_2O$, one or more of $NaPO_3$, $NaNO_3$, and $Na_2CO_3$ were used.

In the case of $K_2O$, one or more of $KPO_3$, $KNO_3$, and $K_2CO_3$ were used.

In the case of CuO, one or more of CuO and $Cu(PO_3)_2$ were used.

In the case of $MoO_3$, one or more of $MoO_3$ and $Na_2MoO_4$ were used.

The raw materials of the glass are not limited to the above, and publicly-known materials can be used.

[Evaluation]

Regarding the glass sample manufactured as described above, transmittance values corresponding to the thickness of the glass, which is 0.3 mm, were obtained by measuring the transmittance of light over a wavelength range of 350 nm to 1,200 nm using a spectrophotometer (Manufactured by JASCO Corporation; V-570). The average transmittance B of light over a wavelength range of 350 nm to 400 nm, the average transmittance A of light over a wavelength range of 450 nm to 500 nm, and the average transmittance of light over a wavelength range of 850 nm to 900 nm were obtained, based on the obtained transmittance values. The average transmittance ratio A/B was calculated, based on the aforementioned average transmittance A and the aforementioned average transmittance B.

The results are presented in Tables 3, 4, and 6. FIG. 1 illustrates the transmittance of light over a wavelength range of 300 nm to 1,200 nm in Example 1 (Comparative Example) and Example 7 (Exemplary Example), whereas FIG. 2 illustrates the transmittance of light over a wavelength range of 350 nm to 600 nm.

TABLE 1

Unit: Mass %

| | Example 1 | Example 2 | Example 3 | Example 4 | Example 5 | Example 6 |
|---|---|---|---|---|---|---|
| $P_2O_5$ | 68.73 | 68.53 | 68.53 | 68.33 | 67.93 | 67.93 |
| $Al_2O_3$ | 11.36 | 11.32 | 11.32 | 11.29 | 11.23 | 11.23 |
| $Na_2O$ | 3.16 | 3.15 | 3.15 | 3.14 | 3.13 | 3.13 |
| $K_2O$ | 9.06 | 9.04 | 9.04 | 9.01 | 8.96 | 8.96 |
| $MoO_3$ | 0.00 | 0.30 | 0.30 | 0.59 | 1.17 | 1.17 |
| CuO | 7.68 | 7.66 | 7.66 | 7.63 | 7.59 | 7.59 |
| Total | 100.00 | 100.00 | 100.00 | 100.00 | 100.00 | 100.00 |

TABLE 2

Unit: Mass %

| | Example 7 | Example 8 | Example 9 | Example 10 | Example 11 | Example 12 |
|---|---|---|---|---|---|---|
| $P_2O_5$ | 68.68 | 68.62 | 68.50 | 68.69 | 68.65 | 68.61 |
| $Al_2O_3$ | 11.14 | 10.92 | 10.48 | 11.35 | 11.34 | 11.34 |
| $Na_2O$ | 3.16 | 3.16 | 3.15 | 3.16 | 3.16 | 3.16 |
| $K_2O$ | 9.06 | 9.05 | 9.03 | 9.06 | 9.05 | 9.05 |

TABLE 2-continued

|  | Example 7 | Example 8 | Example 9 | Example 10 | Example 11 | Unit: Mass %<br>Example 12 |
|---|---|---|---|---|---|---|
| $MoO_3$ | 0.30 | 0.59 | 1.18 | 0.06 | 0.12 | 0.18 |
| CuO | 7.67 | 7.67 | 7.65 | 7.67 | 7.67 | 7.67 |
| Total | 100.00 | 100.00 | 100.00 | 100.00 | 100.00 | 100.00 |

TABLE 3

|  | Example 1 | Example 2 | Example 3 | Example 4 | Example 5 | Example 6 |
|---|---|---|---|---|---|---|
| Average transmittance [%] of light over a wavelength range of 450 nm to 500 nm ... A | 88.15 | 88.91 | 88.61 | 89.58 | 89.51 | 89.12 |
| Average transmittance [%] of light over a wavelength range of 850 nm to 900 nm | 0.28 | 0.27 | 0.31 | 0.30 | 0.30 | 0.29 |
| Average transmittance [%] of light over a wavelength range of 350 nm to 400 nm ... B | 77.64 | 76.67 | 73.29 | 75.48 | 70.00 | 67.88 |
| Average transmittance ratio A/B | 1.135 | 1.160 | 1.209 | 1.187 | 1.279 | 1.313 |
| Plate thickness [mm] | 0.3 | 0.3 | 0.3 | 0.3 | 0.3 | 0.3 |

TABLE 4

|  | Example 7 | Example 8 | Example 9 | Example 10 | Example 11 | Example 12 |
|---|---|---|---|---|---|---|
| Average transmittance [%] of light over a wavelength range of 450 nm to 500 nm ... A | 89.92 | 89.52 | 89.17 | 88.66 | 89.37 | 88.63 |
| Average transmittance [%] of light over a wavelength range of 850 nm to 900 nm | 0.33 | 0.31 | 0.33 | 0.34 | 0.34 | 0.33 |
| Average transmittance [%] of light over a wavelength range of 350 nm to 400 nm ... B | 78.38 | 75.74 | 71.01 | 78.24 | 78.25 | 77.40 |
| Average transmittance ratio A/B | 1.147 | 1.182 | 1.256 | 1.133 | 1.142 | 1.145 |
| Plate thickness [mm] | 0.3 | 0.3 | 0.3 | 0.3 | 0.3 | 0.3 |

TABLE 5

|  | Example 13 | Example 14 | Example 15 | Example 16 | Unit: Mass %<br>Example 17 |
|---|---|---|---|---|---|
| $P_2O_5$ | 67.06 | 66.86 | 66.66 | 68.90 | 68.69 |
| $Al_2O_3$ | 13.29 | 13.25 | 13.21 | 13.07 | 13.03 |
| $Na_2O$ | 0.00 | 0.00 | 0.00 | 3.17 | 3.16 |
| $K_2O$ | 4.65 | 4.64 | 4.62 | 5.19 | 5.17 |
| $B_2O_3$ | 0.35 | 0.35 | 0.35 | 0.00 | 0.00 |
| CaO | 0.51 | 0.51 | 0.51 | 0.00 | 0.00 |
| MgO | 0.50 | 0.50 | 0.50 | 0.00 | 0.00 |
| BaO | 4.19 | 4.18 | 4.16 | 0.00 | 0.00 |

TABLE 5-continued

|  | Example 13 | Example 14 | Example 15 | Example 16 | Unit: Mass %<br>Example 17 |
|---|---|---|---|---|---|
| ZnO | 4.41 | 4.40 | 4.38 | 0.00 | 0.00 |
| MoO$_3$ | 0.00 | 0.30 | 0.59 | 0.00 | 0.30 |
| CuO | 5.03 | 5.02 | 5.00 | 9.67 | 9.64 |
| Total | 100.00 | 100.00 | 100.00 | 100.00 | 100.00 |

TABLE 6

|  | Example 13 | Example 14 | Example 15 | Example 16 | Example 17 |
|---|---|---|---|---|---|
| Average transmittance [i] of light over a wavelength range of 450 nm to 500 nm . . . A | 86.46 | 87.10 | 88.39 | 81.26 | 87.33 |
| Average transmittance [%] of light over a wavelength range of 850 nm to 900 nm | 2.31 | 2.18 | 1.98 | 0.08 | 0.07 |
| Average transmittance [i] of light over a wavelength range of 350 nm to 400 nm . . . B | 73.77 | 71.61 | 70.73 | 57.26 | 69.43 |
| Average transmittance ratio A/B | 1.172 | 1.216 | 1.250 | 1.419 | 1.258 |
| Plate thickness [mm] | 0.3 | 0.3 | 0.3 | 0.3 | 0.3 |

In the Exemplary Examples (Examples 2 to 12) of the present disclosure, with the inclusion of Mo in the glass, the average transmittance of light over a wavelength range of 450 nm to 500 nm is 88.5% or more, the average transmittance of light over a wavelength range of 850 nm to 900 nm is 1.5% or less, and the transmittance of the light in the near-infrared region can be kept low while maintaining a high transmittance of the light in the visible region. In particular, compared with the glass of the Comparative Example (Example 1) not containing Mo, the glass of the Exemplary Examples (Examples 2 to 12) containing Mo have improved average transmittances of light (blue light, in particular) in the visible region. It is inferred that these effects are due to the fact that the proportion of the Cu$^+$ component in the glass decreased owing to the inclusion of the Mo in the glass.

The glass of the Exemplary Examples (Examples 14 and 15) of the present disclosure are obtained by adding only Mo to the glass of the Comparative Example (Example 13) which does not contain Mo. The glass of the Exemplary Example (Example 17) of the present disclosure is obtained by adding only Mo to the glass of the Comparative Example (Example 16) which does not contain Mo. The optical properties of these types of glass demonstrate that the average transmittance of light (blue light, in particular), in the visible region, of the glass of the embodiment containing Mo is improved compared with the glass of the comparative example which does not contain Mo. It is inferred that these effects are due to the fact that the proportion of the Cu$^+$ component in the glass decreased owing to the inclusion of the Mo in the glass.

Examples 3 and 6 have the same glass composition as Examples 2 and 5, respectively, and only the temperature at which the glass raw material is melted is changed (increased by 50° C.). Based on the results of the optical properties presented in Table 3, the glass of Examples 3 and 6 can maintain a higher average transmittance of light (blue light, in particular) in the visible region than that of the Comparative Example (Example 1) that does not contain Mo, even if the melting temperature of the glass raw material is increased.

Although the present invention has been described above based on specific embodiments, the present invention is not limited to these embodiments. Further, various changes, modifications, substitutions, additions, deletions, and combinations can be made to the above-described embodiments within the scope defined by the claims, which are included within the technical scope of the present invention.

What is claimed is:

1. An optical filter-type glass, comprising:
a glass comprising a P component, a Cu component, and a Mo component and being substantially free of F and R'O,
wherein the glass has a composition comprising, in mass % on an oxide basis, 60% to 75% of P$_2$O$_5$, 9% to 16.5% of Al$_2$O$_3$, 4% to 20% of ΣR$_2$O, more than 7% and up to 20% of CuQ, and 0.01% to 1.18% of MoO$_3$, where R$_2$O is at least one component selected from the group consisting of Li$_2$O, Na$_2$O, K$_2$O, Rb$_2$O, and Cs$_2$O, and ΣR$_2$O is a total amount of R$_2$O, and R'O is at least one component selected from the group consisting of CaO, MgO, BaO, SrO, and ZnO.

2. The optical filter-type glass according to claim 1, wherein the composition of the glass includes, in mass % on an oxide basis, 5% or less of SiO$_2$, GeO$_2$, ZrO$_2$, SnO$_2$, TiO$_2$, CeO$_2$, WO$_3$, Y$_2$O$_3$, La$_2$O$_3$, Gd$_2$O$_3$, Yb$_2$O$_3$, and Nb$_2$O$_5$ as a total amount.

3. The optical filter-type glass according to claim 1, wherein the glass is substantially free of Fe$_2$O$_3$, Cr$_2$O$_3$, Bi$_2$O$_3$, NiO, V$_2$O$_5$, MnO$_2$, and CoO.

4. The optical filter-type glass according to claim 1, wherein the glass has an average transmittance of light of 88.5% or more over a wavelength range of 450 nm to 500 nm and an average transmittance of light of 1.5% or less over a wavelength range of 850 nm to 900 nm, when a thickness of the glass is 0.3 mm.

5. The optical filter-type glass according to claim 1, wherein the glass has an average transmittance ratio A/B in a range of 1.140 to 2.000, where A is an average transmittance of light over a wavelength range of 450 nm to 500 nm and B is an average transmittance of light over a wavelength range of 350 nm to 400 nm, when a thickness of the glass is 0.3 mm.

6. An optical filter, comprising:
the optical filter-type glass of claim 1.

7. A solid-state imaging device, comprising:
the optical filter of claim 6.

8. The optical filter-type glass according to claim 1, wherein the glass is substantially free of divalent cations of elements other than Cu.

9. The optical filter-type glass according to claim 1, wherein the composition of the glass includes 0.01% to 0.30% of $MoO_3$ in mass % on an oxide basis.

10. An optical filter-type glass, comprising:
a glass comprising a P component, a Cu component, and a Mo component and being substantially free of F,
wherein the glass has a composition comprising, in mass % on an oxide basis, 60% to 75% of $P_2O_5$, 9% to 16.5% of $Al_2O_3$, 4% to 20% of $\Sigma R_2O$, 0% to 8% $\Sigma R'O$, more than 7% up to 20% of CuO, and 0.01% to 0.30% of $MoO_3$, where $R_2O$ is at least one component selected from the group consisting of $Li_2O$, $Na_2O$, $K_2O$, $Rb_2O$, and $Cs_2O$, and $\Sigma R_2O$ is a total amount of $R_2O$, R'O is at least one component selected from the group consisting of CaO, MgO, BaO, SrO, and ZnO, and $\Sigma R'O$ is a total amount of R'O.

11. The optical filter-type glass according to claim 10, wherein the composition of the glass includes, in mass % on an oxide basis, 5% or less of $SiO_2$, $GeO_2$, $ZrO_2$, $SnO_2$, $TiO_2$, $CeO_2$, $WO_3$, $Y_2O_3$, $La_2O_3$, $Gd_2O_3$, $Yb_2O_3$, and $Nb_2O_5$ as a total amount.

12. The optical filter-type glass according to claim 10, wherein the glass is substantially free of $Fe_2O_3$, $Cr_2O_3$, $Bi_2O_3$, NiO, $V_2O_5$, $MnO_2$, and CoO.

13. The optical filter-type glass according to claim 10, wherein the glass has an average transmittance of light of 88.5% or more over a wavelength range of 450 nm to 500 nm and an average transmittance of light of 1.5% or less over a wavelength range of 850 nm to 900 nm, when a thickness of the glass is 0.3 mm.

14. The optical filter-type glass according to claim 10, wherein the glass has an average transmittance ratio A/B in a range of 1.140 to 2.000, where A is an average transmittance of light over a wavelength range of 450 nm to 500 nm and B is an average transmittance of light over a wavelength range of 350 nm to 400 nm, when a thickness of the glass is 0.3 mm.

15. An optical filter, comprising:
the optical filter-type glass of claim 10.

16. A solid-state imaging device, comprising:
the optical filter of claim 15.

17. The optical filter-type glass according to claim 10, wherein the glass is substantially free of divalent cations of elements other than Cu.

* * * * *